Aug. 26, 1924.                                                  1,506,030
                        I. R. SMITH
                      WHEELBARROW ARM
                      Filed June 4, 1923
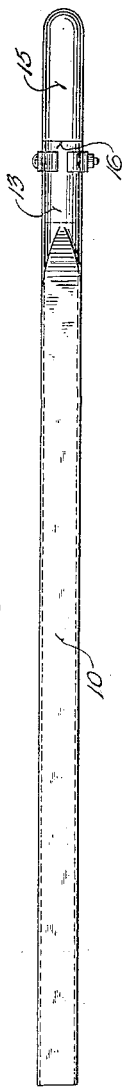
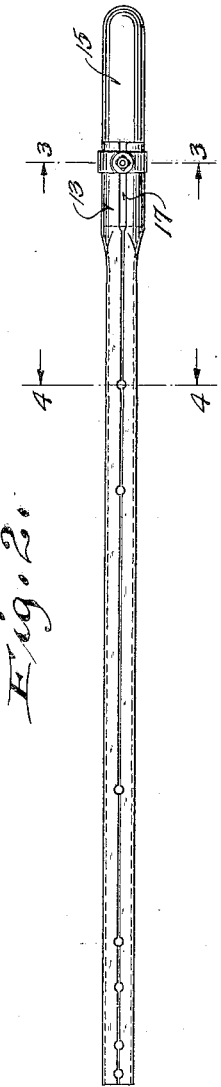
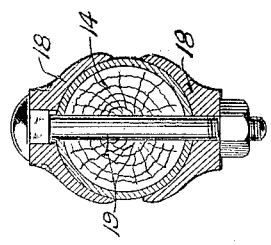
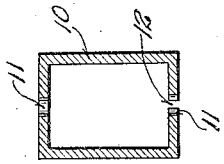

Patented Aug. 26, 1924.

1,506,030

UNITED STATES PATENT OFFICE.

IRVING R. SMITH, OF WAUWATOSA, WISCONSIN.

WHEELBARROW ARM.

Application filed June 4, 1923. Serial No. 643,344.

*To all whom it may concern:*

Be it known that I, IRVING R. SMITH, a citizen of the United States, and resident of Wauwatosa, in the county of Milwaukee and State of Wisconsin, have invented new and useful Improvements in Wheelbarrow Arms, of which the following is a description, reference being had to the accompanying drawings, which are a part of this specification.

This invention relates to wheelbarrow arms, and particularly to wheelbarrow arms formed of sheet metal.

It is an object of this invention to facilitate and cheapen the manufacture of wheelbarrow arms to provide an efficient and convenient means for securing thereto handles which are preferably made of wood.

Other objects and the novel features of construction of this invention will be made more apparent as the description proceeds, especially when considered in connection with the accompanying drawings, wherein:

Figure 1 is a side elevation of a wheelbarrow arm constructed in accordance with this invention;

Fig. 2 is a bottom plan view of the structure illustrated in Fig. 1;

Fig. 3 is an enlarged transverse sectional view, taken on the plane indicated by the line 3—3 in Fig. 2; and, Fig. 4 is an enlarged transverse sectional view, taken on the plane indicated by the line 4—4 in Fig. 2.

Referring now more particularly to the drawings wherein like reference characters indicate like parts, it will be noted that the reference character 10 indicates generally the wheelbarrow arm which in ordinary wheelbarrow construction extends longitudinally to support intermediate its length the hopper-shaped body, and at its forward ends the wheel. This present invention contemplates forming these arms of sheet metal bent substantially rectangular in cross section and arranged so that the joint is disposed at the bottom. The body is pierced throughout its length by a plurality of vertically arranged apertures 11 provided for attaching the various parts thereto. In constructing these arms of sheet metal a space 12 is left between the longitudinal edges, as clearly illustrated in Fig. 4.

The handle end 13 of each arm 10 is preferably circular in cross section and is adapted to receive the reduced end 14 of a handle 15, the reduction of the end of the handle providing an annular shoulder 16 which engages the end of the arm 10.

In forming the cylindrical portion 13 of the arm, the edges thereof are arranged further apart forming a relatively wide space 17. A pair of clamping members 18 are provided, together with a bolt and nut 19, whereupon the arm 10 is securely clamped to the handle 13. By providing the relatively wide space 17, the clamping members 18 can, by their clamping action, reduce the diameter of the cylindrical portion 17 so as to cause the same to firmly grip the handle to enable a rigid connection between these parts to be established.

Obviously, wooden handles may be quickly and easily associated with the wheelbarrow arms, and may, when the occasion demands, be removed and replaced by new ones. The connection between the handles and the arms is extremely simple, but the connection obtained is a strong and rigid one.

While the invention has been described with reference to one specific form of wheelbarrow arm, it is not intended that this invention be unnecessarily limited, but reservation is made to make such changes as may come within the purview of the accompanying claims.

Having thus described the invention, what is claimed is:

1. A wheelbarrow arm formed of sheet metal and bent substantially rectangular in cross section, one end of said arm being bent substantially cylindrical in cross section, a handle adapted to be inserted into said cylindrical end and clamping means for clamping the end of said arm around said handle.

2. A wheelbarrow arm formed of sheet metal bent substantially rectangular in cross section throughout most of its length and substantially cylindrical at one of its ends, the rounded portion of said arm having a longitudinal slot, a handle insertible into the rounded end of said arm and clamping means for clamping said arm around said handle.

3. A wheelbarrow arm formed of sheet metal having a portion thereof substantially rectangular in cross section, one end of said arm being substantially cylindrical in cross section, the edges of the metal of the rounded end being spaced to form a longitudinal slot, a handle insertible into the rounded end of the arm and clamping means for causing said arm to grip said handle.

4. A wheelbarrow arm formed of sheet metal bent to form a portion substantially rectangular in cross section and a substantially cylindrical portion in cross section, the edge of the metal of the cylindrical portion being spaced to form a longitudinal slot, a wooden shouldered handle insertible into the cylindrical end of said arm and clamping means comprising clamping members and a bolt passing through said arm and handle for clamping said arm around said handle.

5. A wheelbarrow arm formed of sheet metal and bent adjacent its end to form a portion substantially cylindrical in cross section, the joint formed in bending being arranged at the bottom of the arm, the edges of the joint of the cylindrical portion being spaced to form a longitudinal slot, a handle insertible into the cylindrical portion of the arm and clamping means for clamping said arm around said handle.

In testimony whereof, I affix my signature.

IRVING R. SMITH.